United States Patent [19]

Morgan

[11] 4,388,191

[45] Jun. 14, 1983

[54] FLOAT BAG HOLD DOWN FOR A FILTER

[76] Inventor: Howard W. Morgan, 100 Anchor Rd., Michigan City, Ind. 46360

[21] Appl. No.: 311,961

[22] Filed: Oct. 16, 1981

[51] Int. Cl.³ ............................................. B01D 29/16
[52] U.S. Cl. .................................. 210/452; 210/474; 210/484; 210/497.01
[58] Field of Search .................. 210/452, 484, 497.01, 210/114, 119, 121, 419, 420, 232, 456, 474

[56] References Cited

U.S. PATENT DOCUMENTS

| | | | |
|---|---|---|---|
| 1,063,047 | 5/1911 | Lohrmann | 210/452 |
| 2,864,505 | 12/1958 | Kasten | 210/497.01 |
| 2,987,188 | 6/1961 | Jahreis | 210/452 |
| 3,931,015 | 1/1976 | Jenkins | 210/450 |
| 3,959,137 | 5/1976 | Kirsgalvis | 210/438 |
| 4,220,542 | 9/1980 | Morgan | 210/474 |

FOREIGN PATENT DOCUMENTS 1527 of 1905 United Kingdom ................ 210/452

*Primary Examiner*—Benoit Castel
*Attorney, Agent, or Firm*—James D. Hall

[57] ABSTRACT

A filter for liquids including a combination displacement float and bag hold down. The filter includes a housing with a removable cap and an internal annulus upon which is supported a reticulated filter element. The float hold down carries a retainer extension and is compressed by the housing cap with the retainer extension pressed against the filter element on the housing annulus.

2 Claims, 3 Drawing Figures

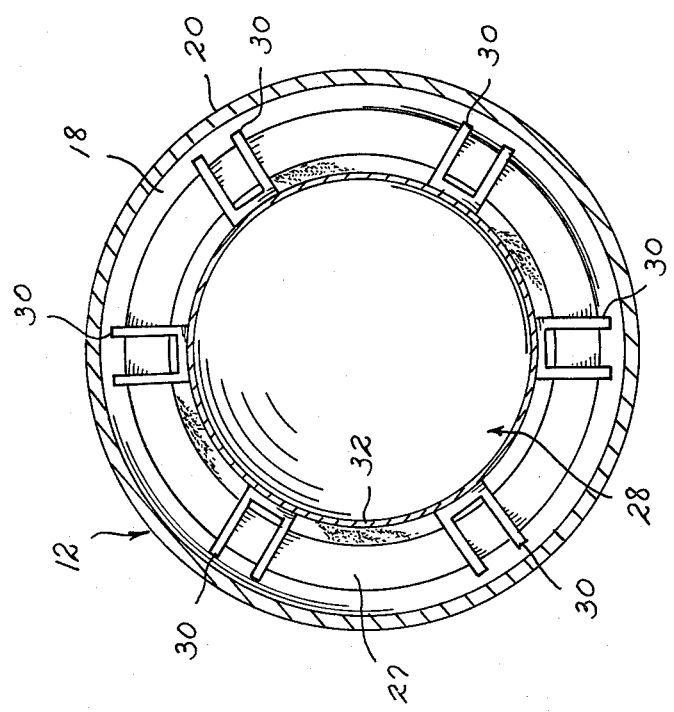

FLOAT BAG HOLD DOWN FOR A FILTER

SUMMARY OF THE INVENTION

This invention relates to a liquid filter and will have special application to a filtering apparatus used with a liquid displacement float to reduce the amount of liquid within the filter and to hold an internal filter element in place.

Devices to alter the internal volume of a liquid filter are well known in the art. Some examples are disclosed in U.S. Pat. Nos. 3,931,015; 3,959,137 and 4,220,542. The displacement device illustrated in U.S. Pat. No. 3,931,015 comprises an extension of the removable filter top. The device of U.S. Pat. No. 3,959,137 is a float which is used to reduce internal liquid volume. The displacement device of U.S. Pat. No. 4,220,542 serves to block a portion of the filter bag to provide a drain area for the remaining liquid within the filter when the float is removed to replace the filter bag.

The present invention offers a versatile device which functions to both reduce the volume of fluid within the filter housing during bag replacement and to anchor the bag or filter element against an internal annulus. The invention includes an enclosed float with radially extending projections. These radially extending projections compress the rim of an internal filter element against the internal annulus within the filter housing to prevent fluid leakage around the filter element rim.

Accordingly, it is an object of this invention to provide a combination displacement float and filter element hold down.

Another object is to provide an economically usable liquid filter.

Other objects will become apparent upon a reading of the following description.

BRIEF DESCRIPTION OF THE DRAWINGS

FIG. 3 is a cross-sectional view taken along line 3—3 of FIG. 1.

DESCRIPTION OF THE PREFERRED EMBODIMENT

Figure 2:
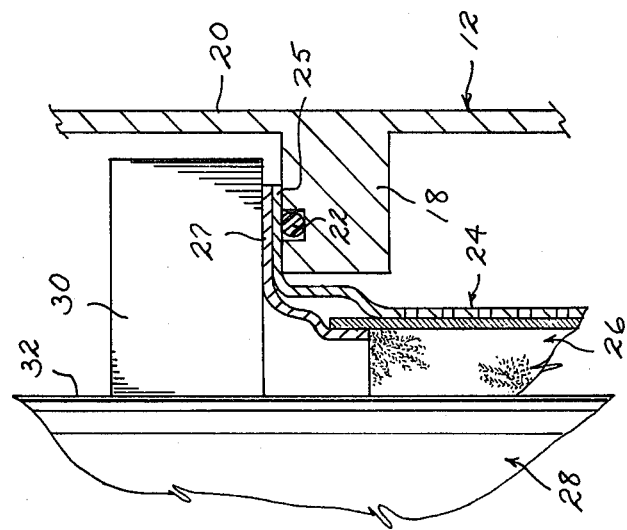
FIG. 2 is a detailed enlargement as seen within broken line circle 2 of FIG. 1.
Figure 1:
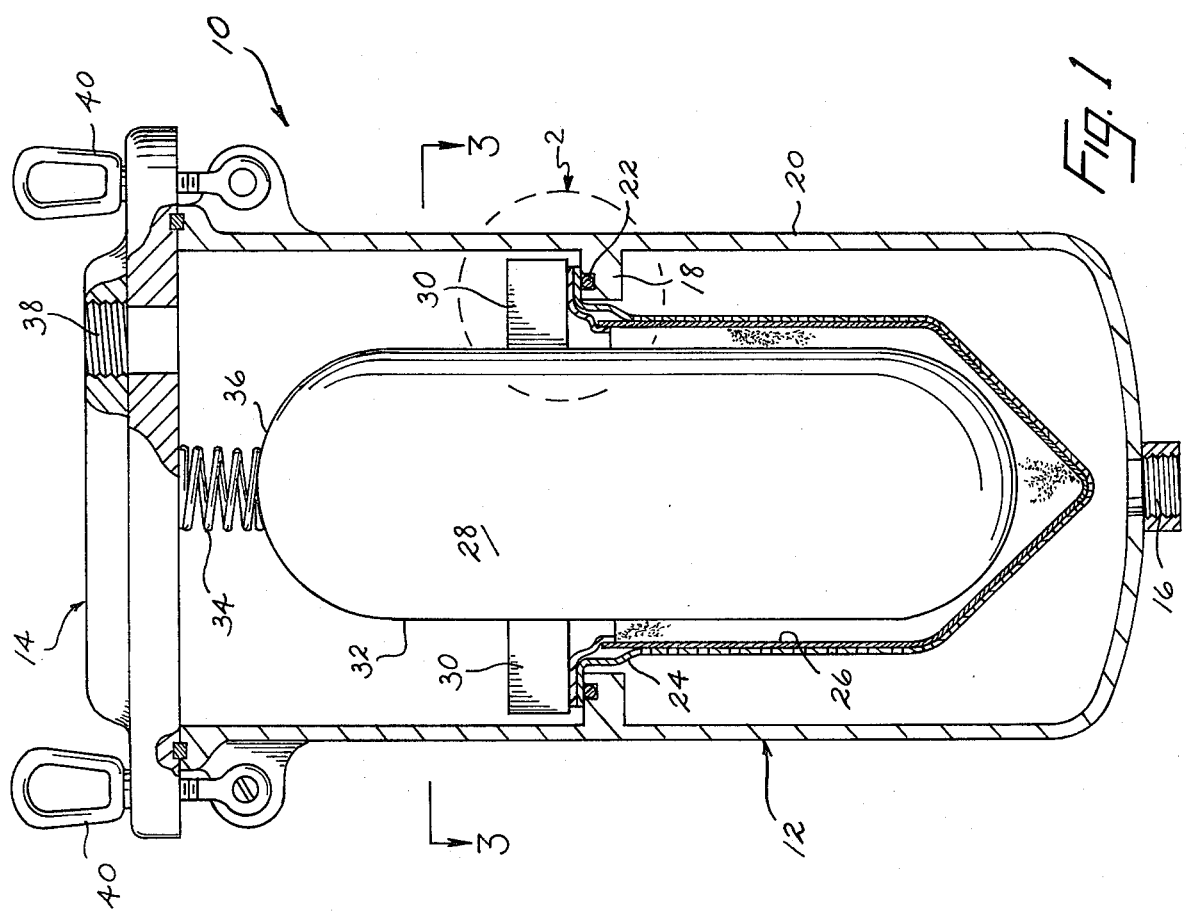
FIG. 1 is a longitudinal sectional view of a filter having the bag hold down and float device therein.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

As shown in the drawings, the filter 10 includes a housing 12 with a removable cap 14. Housing 12 is open at its top and has an outlet 16 in its base. An annulus 18 extends from the side wall 20 of the housing. Annulus 18 carries an O-ring 22. A rigid filter basket 24 rests upon annulus 18. A flexible filtering bag 26 fits into filter basket 24. Basket 24 is of a screen construction and filtering bag 26 is of a fabric form. A float 28 is carried within housing 12. Float 28 is a closed or sealed hollow container with spaced arms 30 extending radially from its sides 32. A helical spring 34 is affixed to the top 36 of float 28.

Cap 14 spans the top of housing 12. A liquid inlet 38 extends through cap 14 and communicates with the interior of housing 12. Screw clamps 40 affixed to housing 12 hold cap 14 in place over the housing 12.

To utilize the invention, basket 24 at its flange 25 and filtering bag 26 at its flange 27 are seated upon annulus 18 over O-ring 22. Float 28 is inserted into housing 12. Arms 30 of float 28 rest upon filter element 26 and serve also to stabilize float 28 within housing 12. Cap 14 is then positioned and screw clamps 40 secured in place. With cap 14 in place, spring 34 attached to float 28 is compressed against cap 14 and urges float arms 30 against filtering bag 26. The pressure exerted by arms 30 creates a liquid-tight seal of the filtering bag and basket 24 at O-ring 22. In this embodiment, the lower end of float 28 is not shown contacting the lower end of filter bag 26. If desired, the float lower end could be designed to contact bag 26 at its lower end to form a seal which will facilitate drainage of the housing when the float is removed, such as seen in U.S. Pat. No. 4,220,542.

As liquid flows into housing 12 through inlet 38, it passes around float 28 between arms 30 through filtering bag 26 and basket 24, and out through outlet 16.

It is to be understood that the invention is not to be limited to the preceding description but may be modified within the scope of the appended claims.

I claim:

1. A filter for liquids comprising a housing including side and bottom walls with a top opening, said housing side wall carrying an annulus projecting into the interior of said housing, said annulus spaced from said housing top opening, a removable cap spanning said housing top opening, a bag-shaped removable reticulated filter element carried within said housing and having a circumferential outward flange supported upon said annulus, a liquid inlet in flow communication with the interior of said filter element and a liquid outlet in flow communication with the exterior of the filter element, a removable closed float means for decreasing the volumetric interior size of said housing, said float means having top and bottom end walls and side walls, said float means side walls having spaced arm parts extending radially therefrom, said float means inserted into said housing with said bottom end wall thereof extending into said filter element interior and arm parts overlying said filter element flange, a spring compressed between said cap and said float means top end wall urging said filter element flange by said float means arm parts against said housing side wall annulus, at least a portion of said float means side wall being spaced from said filter element whereby liquid entering said inlet flows about said float means and between said arm parts thereof into the interior of the filter element and through the filter element and out said outlet.

2. The filter of claim 1 wherein said filter element includes a rigid basket supported upon said housing side wall annulus and a flexible bag carried within said basket.

* * * * *